United States Patent [19]

Braun

[11] 4,133,622
[45] Jan. 9, 1979

[54] APPARATUS FOR MOLDING INSULATING DISKS ON COAXIAL-CABLE WIRE

[75] Inventor: Dieter Braun, Schildgen, Fed. Rep. of Germany

[73] Assignee: Felten & Guilleaume Carlswerk AG, Cologne, Fed. Rep. of Germany

[21] Appl. No.: 808,622

[22] Filed: Jun. 21, 1977

Related U.S. Application Data

[63] Continuation-in-part of Ser. No. 785,358, Apr. 7, 1977.

[30] Foreign Application Priority Data

Apr. 7, 1976 [DE] Fed. Rep. of Germany ....... 2614937

[51] Int. Cl.² .............................................. B29F 1/10
[52] U.S. Cl. ................................ 425/129 R; 264/328; 425/574; 425/576
[58] Field of Search ................... 425/129 R, 576, 545, 425/122, 121, 814, 552, 574, 575; 264/328, 251

[56] References Cited

U.S. PATENT DOCUMENTS

| 2,465,656 | 3/1949 | Morin | 425/570 |
|---|---|---|---|
| 2,516,789 | 7/1950 | Montoriol et al. | 264/328 |
| 2,744,289 | 5/1956 | Wanders | 425/121 |
| 3,097,395 | 7/1963 | Yoshida | 425/122 |
| 3,134,137 | 5/1964 | Immel | 425/576 |
| 3,355,771 | 12/1967 | Alberts | 425/129 X |
| 3,445,915 | 5/1969 | Cuckson et al. | 425/545 X |
| 3,594,865 | 7/1971 | Erb | 425/115 X |
| 3,635,612 | 1/1972 | Fortin et al. | 425/576 X |
| 3,762,000 | 10/1973 | Menzin et al. | 425/814 X |

FOREIGN PATENT DOCUMENTS

| 2024771 | 12/1971 | Fed. Rep. of Germany | 428/814 |
|---|---|---|---|
| 1006605 | 4/1952 | France | 264/251 |
| 38-3831 | 4/1963 | Japan | 425/576 |

Primary Examiner—William R. Briggs
Attorney, Agent, or Firm—Michael J. Striker

[57] ABSTRACT

A plurality of cylindrically segmental mold pairs together forming an array having an outer surface and each having a mold cavity and an inlet between a respective cavity and the surface is continuously rotated past the end of a generally stationary nozzle so as sequentially to align the inlets with the nozzle end. A plastified and hardenable resin is continuously fed under pressure to the nozzle end which is spaced from the surface of the mold array by a predetermined distance. Thus resin material continuously exits from the nozzle. When the nozzle is aligned with an inlet opening this material enters the inlet opening and forms a body therein and a sprue integral with the body. When the end is not aligned with the inlet the material escapes laterally from between the end and the surface and forms on the surface a generally continuous film unitary with the sprues. The mold pairs are sequentially opened and closed by a cam on successive spaced-apart locations of a wire before and after the molding thereon of the bodies. The sprues and the film are separated from the body after such molding and replastified for reuse.

20 Claims, 4 Drawing Figures

APPARATUS FOR MOLDING INSULATING DISKS ON COAXIAL-CABLE WIRE

CROSS-REFERENCE TO RELATED APPLICATION

This application is a continuation-in-part of my copending patent application Ser. No. 785,358 filed Apr. 7, 1977, the entire disclosure of which is herewith incorporated by reference.

BACKGROUND OF THE INVENTION

The present invention relates to an apparatus for molding a succession of discrete bodies on an elongated flexible element. More particularly this invention concerns the formation of a succession of insulating disks on a wire intended to serve as the inner conductor in a coaxial cable.

A coaxial cable is known having an outer solid or braided conductor of tubular shape which is normally grounded. Received coaxially within this tubular outer conductor is an inner conductor that is frequently spaced radially inwardly of the outer conductor by means of a succession of synthetic-resin insulating disks molded on the inner conductor. This air-insulated type of coaxial cable is used, for example, in long distance communication systems or the like.

Methods are known for making such an inner conductor. In my British Pat. No. 1,406,100 as well as my U.S. Pat. No. 3,918,864 there is disclosed a method and apparatus using a plurality of mold pairs together forming an array having a cylindrical outer surface. Each of these mold pairs has a mold cavity and an inlet passage extending between the respective cavity and a pressurized source of plastified and hardenable resin material. A valve is provided in each of these inlet passages. The wire constituting the elongated flexible element on which is to be molded a succession of discrete bodies is fed to this array of mold pairs which are sequentially closed on successive spaced-apart portions of the flexible element. The array is rotated about a central axis and as soon as each of the mold pairs has closed on the wire the respective valve is temporarily opened so as to fill this mold cavity with the synthetic resin being employed to form the insulating bodies or disks. Thereafter the valve is closed and the respective body formed in the cavity and sprue formed in the inlet passage unitary with the body harden. Thereafter the respective mold pair is opened and the conductor carrying the body and sprue is pulled from the array of mold pairs.

Such an arrangement produces an extremely high-quality product and can operate at a high rate of speed. It, however, has the considerable disadvantage that the equipment needed is very complex and quite expensive. This complexity further leads to periodic failure so that it is necessary to shut the machine down and service it frequently.

Another arrangement is known from French Pat. No. 1,006,605. In this system there is, once again, a cylindrically annular array of mold pairs. Here the device is coupled with a stationary extruder head that is pressed radially against the cylindrical outer surface of the array. The inlet passages extend radially outwardly from the mold cavities to the outer surface. Thus the array of mold pairs is rotated past the extruder head so as to sequentially align the mold-cavity inlets with the extruder head pressed against the outer surface. As each inlet is aligned with the mold head the plastified material continuously under pressure inside the head enters the mold cavity through the inlet.

This system, simple as it appears to be at first sight, however, has the considerable disadvantage that there is periodically some leakage between the complementarily shaped surfaces of the nozzle and mold array, so that plastified material can escape and form lumps on the mold array. This leakage is most common at the regions between adjacent mold pairs. Furthermore the material forced under pressure into each of the mold cavities tends to push back out to a limited extent after each of these cavities passes the nozzle, thereby again forming a lump on the surface of the mold array.

An attempt has been made to overcome this disadvantage by extremely finely machining the mold pairs and extruder head, and by urging the extruder head with great force against the mold array. Such fine machining again greatly increases the cost of the installation. Furthermore the considerable radial pressure exerted by the extruder on the mold array causes considerable wear at the interface between these two elements, and greatly loads the bearing for the mold array. Thus equipment cost is again elevated and the device must be frequently shut down in order to service it and replace a part.

SUMMARY OF THE INVENTION

It is therefore an object of the present invention to provide an improved apparatus for molding a succession of discrete bodies on an elongated flexible element.

More particularly an object of this invention is to provide an improved apparatus for making an inner conductor having a succession of spaced-apart insulating disks for a coaxial cable.

Yet another object is to provide such an apparatus which can operate at high speeds and yet which does not have the above-mentioned disadvantages.

Another object is to provide an improved apparatus for carrying out the method of the above-mentioned application.

These objects are attained according to the present invention in an arrangement wherein an array of mold pairs as described above with reference to French Pat. No. 1,006,605 is used in conjunction with a stationary nozzle. According to this invention, however, the end of the nozzle is spaced from the outer surface of the mold array by a predetermined distance during relative displacement of the nozzle and the mold pairs. Thus when the nozzle end aligns with a mold-cavity inlet it injects resin material through the inlet into the respective cavity and forms therein a body and a sprue integral with the body. Furthermore when the end is not aligned with the inlet the material escapes laterally from between the nozzle end and the surface and forms on the surface of the mold array a generally continuous film which is unitary with the previously formed sprues. After opening of the mold pairs the sprues and the film are separated from the bodies formed on the flexible element.

This method has not only the considerable advantage that equipment costs are relatively low but moreover that it can operate at relatively high speed since the wear between the nozzle end and the outer surface is completely eliminated, as in the region where these two elements are juxtaposed they are separated by a layer of relatively soft plastified material. This film, furthermore, hardens rather rapidly so that it prevents a further escape of resin material from between the nozzle and the other surface of the mold array.

According to another feature of this invention the spacing is established by urging the nozzle toward the mold array with a predetermined force that is slightly smaller than the reaction force which the resin mass exerts in the opposite direction forcing the mold array and nozzle apart. This reaction force is determined by the injection pressure adjusted in accordance with the alotted filling time, the composition and temperature of the resin material being employed and the volume of the mold cavities to be filled, together giving it a certain viscosity, as well as the desired spacing between the two surfaces. The filling time depends on the speed at which the mold inlets pass in front of the nozzle and is chosen in accordance with the previously mentioned conditions so that the time required for the injected material to solidify is shorter than the recycling time of each mold. Such an arrangement allows an extremely fine adjustment of the film thickness so that it can be stripped cleanly off the mold array after it hardens, thereby greatly facilitating demolding of the element formed with the conductor disks, and allowing the production speed to be kept as high as possible.

According to further features of this invention the sprues and film are separated from the bodies and replastified for use again as the resin material used for molding the bodies, sprues, and film at a later time. When a thermoplastic resin such as polyethylene is empoloyed thermal decomposition need hardly be taken into account so that very little waste will occur. Thus the resin employed to form the film and sprues is not wasted.

According to yet another feature of this invention the segmental halves forming the mold pairs are pushed together with a predetermined force that is increased during the injecting operation. Furthermore after the injecting operation and before the mold pairs are opened the mold pairs are cooled so as to minimize hardening time and increase the production rate. As the clamping pressure is thus increased, according to an important feature of this invention the nozzle is pulled with a carefully regulated force toward the mold pair in question.

According to further features of this invention the flexible element is a wire and is withdrawn, e.g. from an overhead supply. The wire is then calibrated and cleaned with a solvent solution. Thereafter the cleaned element is fed at a predetermined speed equal to the orbiting or displacement speed of the mold cavities to the mold pairs and is thereafter withdrawn from the mold pairs at the same speed. The mold pairs together form an annular wire-receiving passage that passes through all of the mold cavities and is dimensioned to snugly receive the wire. Thus the mold itself serves to entrain the wire as the bodies are molded therearound. With such an arrangement it is possible to operate continuously, especially if two separate supplies of wire are employed, so that as the one runs out another wire can be immediately fed through the system, insuring continuous production.

According to yet another feature of the present invention the mold array is mounted on a support having an upwardly extending tubular support shaft defining the mold axis. A cage constituted by an upper plate and a lower plate axially flanking the mold array is rotatable by bearings on this tubular shaft and is connected through the shaft with the output shaft of a motor carried in the support. Rods extend vertically and axially between the two plates of the cage and pass through the mold pairs, with at least one such rod passing through each mold pair whose halves are therefore axially slidable on the respective rod. Compression springs normally bias the mold halves together and are braced against the respective plates and a cam carried on the tubular shaft and non-rotatable about the mold axis constitutes the means for opening and closing the mold pairs. This cam engages between the halves of the mold pair and spreads them axially apart at a location angularly spaced from the nozzle end.

In accordance with a further feature of this invention a wire guide plate is provided which is fixed to the cage and, therefore, is angularly displaceable with the array but axially non-displaceable. The mold halves close axially together only at their outer periphery but inwardly of this periphery are cut away so that the outer periphery of the wire guide or periphery plate can be angularly aligned with the passage defined by the mold halves for the wire. To this end the positioning plate is formed with a plurality of notches and between these notches with teeth whose outer edges constitute the periphery of the plate. Such an arrangement insures the exact positioning of the wire between the mold pairs and greatly reduces wear of the mold.

The mold halves according to another feature of this invention are formed adjacent the outer surface with radially extending ridges or projections. Axially spaced shoes carried by the guide means that serves to radially bias the nozzle and array together bear radially outwardly on these shoes at a location between the mold axis and the nozzle. Thus as a closed mold pair aligns with the nozzle the shoes ride against the back of its ridges so as to pull it and the nozzle toward each other. This construction therefore avoids overloading of the bearing for the mold array. Furthermore means is provided at this location between the mold axis and the nozzle end for axially pressing together the halves of that mold pair directly aligned with the nozzle, so that at least during injection any leakage at the closing plane of the mold pair is ruled out.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

DESCRIPTION OF A PREFERRED EMBODIMENT

Figure 1:
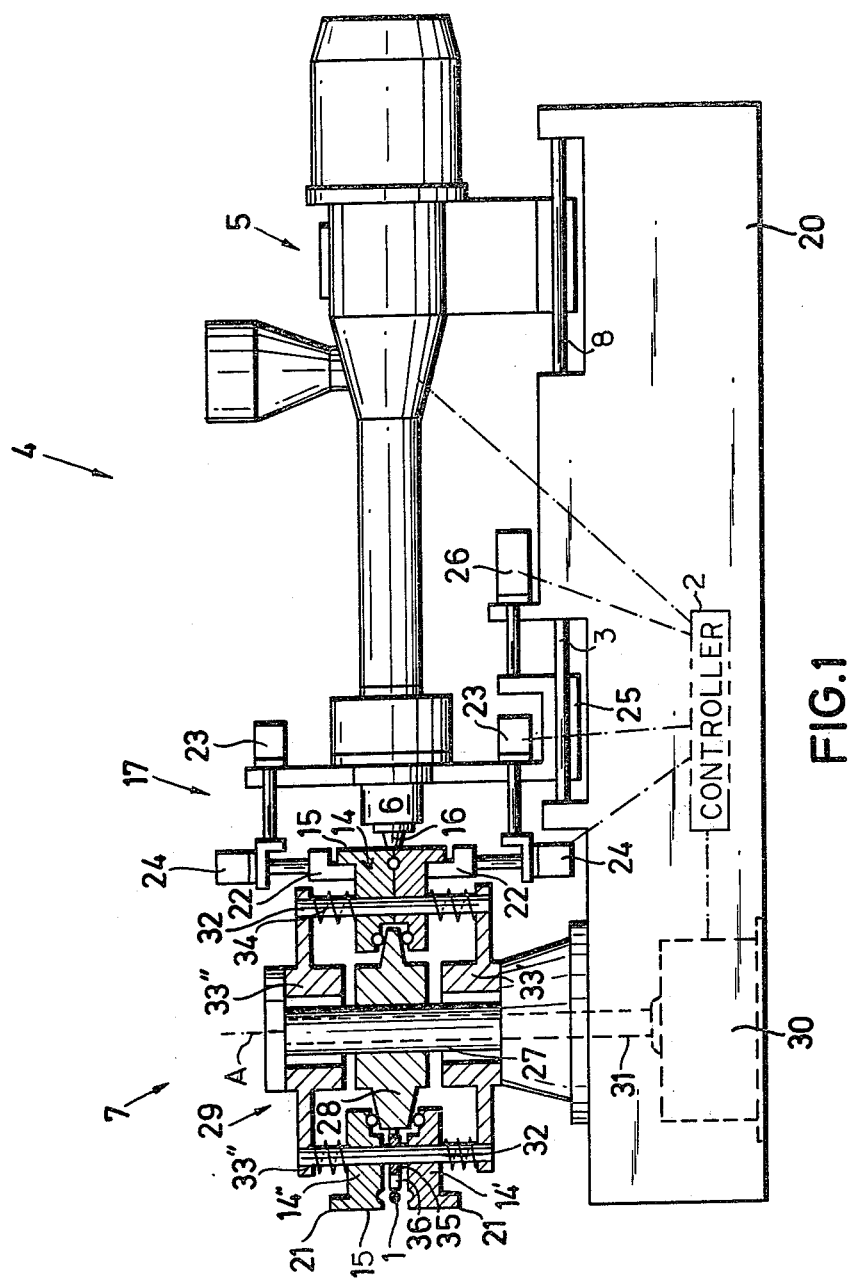
FIG. 1 is a side view partly in vertical section of the apparatus according to this invention.
Figure 3:
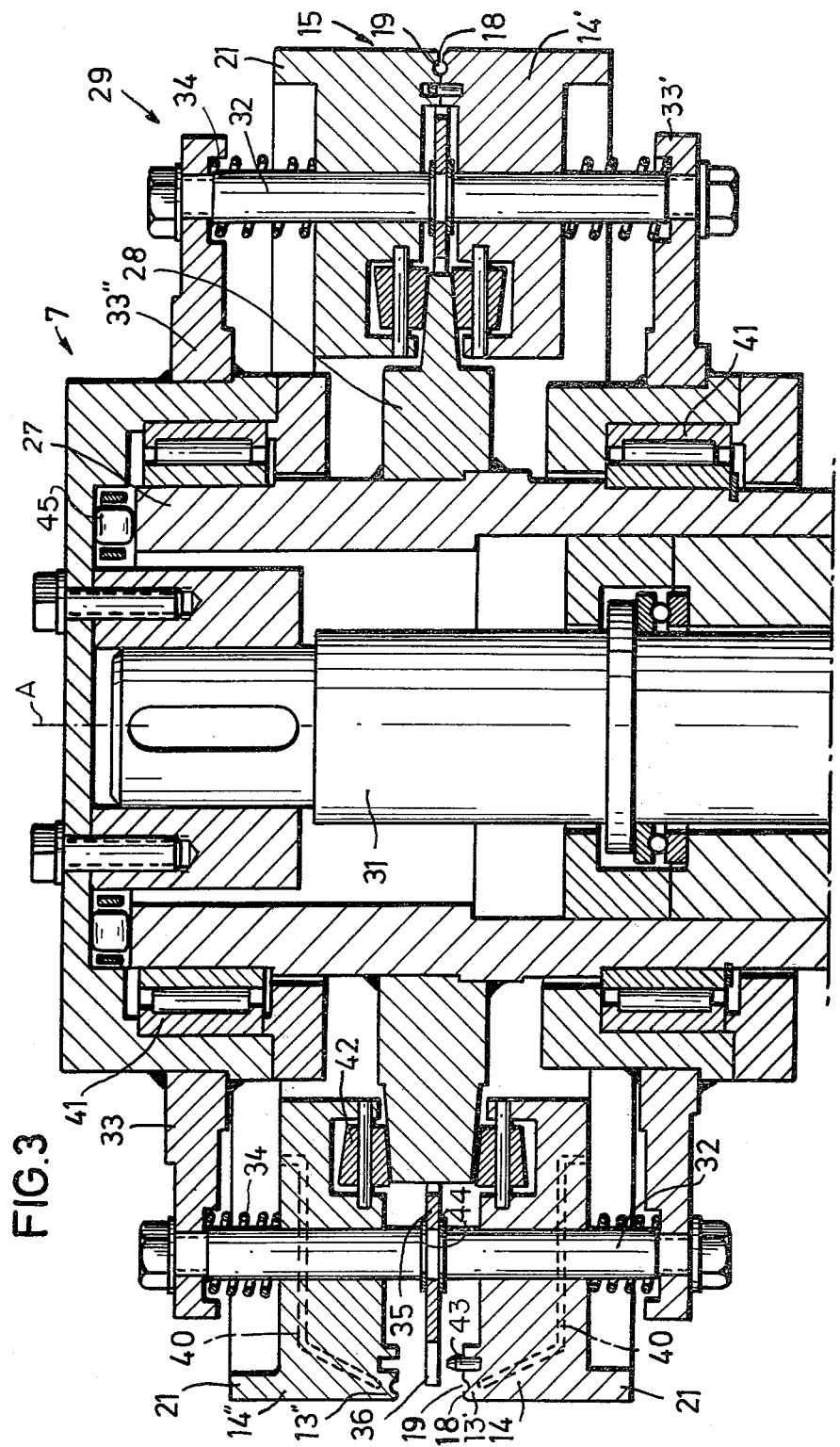
FIG. 3 is an axial section through the mold assembly according to this invention.

As shown in FIGS. 1 and 3 the apparatus according to this invention basically comprises a support constituted as a base 20 upwardly from which extends a tubular shaft 27 defining an upright mold axis A for a mold assembly 7. A resin supply 4 has an extruder 5 carried on the base 20 and provided with a nozzle 6 directed at the mold assembly 7. A guide or positioning arrangement 17 is connected between the mold assembly 7 and the nozzle 6 of the extruder 5 to urge the two radially toward each other.

The mold assembly 7 comprises an annular mold array 14 formed by a plurality of lower mold halves 14' and spectrally identical upper mold halves 14". These mold halves 14' and 14" are formed with respective facing projections 13' and 13" that mate at a plane perpendicular to the axis A. The projections 13' and 13" of each mold pair 14' and 14" form a circumferentially extending passage 19 adapted to receive a wire 1, a short cylindrical cavity 12 adapted to form an insulating body and lying in a respective plane including the axis A, and a sprue or inlet hole or passage 18 extending to the cylindrical outer surface 15 defined by the mold array 14.

The mold assembly 7 also includes a cage 29 supported by means of needle bearings 41 on the shaft 27 extending upwardly from the base 20 and also by means of axial roller bearings 45 on the top end of this shaft 27. The cage 29 is constituted by a lower annular plate 33', an upper annular plate 33" axially spaced from and parallel to the lower plate 33', and a plurality of angularly equispaced and axially extending bolts 32 passing between the plates 33' and 33" and locking them rigidly together. These bolts 32 pass through correspondingly shaped bushing-lined holes in the mold halves 14' and 14" and act as axial guides or tierods for the mold pairs 14', 14". To this end two such rods 32 pass through each pair of mold halves 14', 14". The upper plate 33" is bolted to the upper end of a drive shaft 31 passing axially concentrically through the support shaft 27 and connected at its lower end to a motor 30 in the base 20 of the support for the machine.

The shaft 27 is provided with an annular cam 28 having an edge region received between the upper mold halves 14" and the lower halves 14' and engaging these halves by means of frustoconical rollers 42. This edge is of minimum thickness from a location immediately upstream of the tip 16 of the nozzle 6, relative to the rotation direction D (FIG. 2) of the mold 14 about the axis A, to a location approximately 250° offset therefrom. This cam 28 is fixed to the shaft 27 so that it does not rotate with the mold assembly 7.

Figure 4:
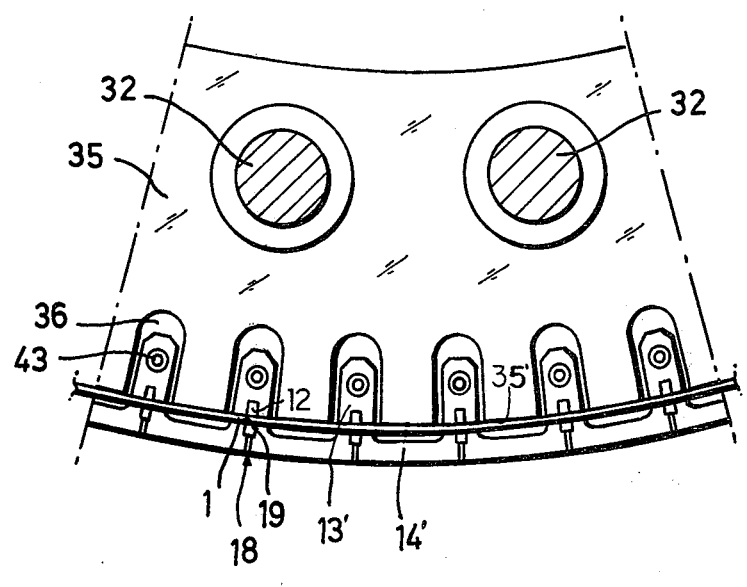
FIG. 4 is a partly sectional top view of a detail of FIG. 3.

Fixed by means of snap rings 44 on the bolts 32 extending between the plates 33' and 33" is an annular rigid metal plate 35 having an outer periphery lying in line circumferentially with the grooves forming the wire-receiving passage 19 and constituted with notches 36 in which the portions 13' and 13" (FIG. 4) are engageable. The wire 1 rides on the outer periphery 35' of this plate or disk 35 and, since centering pins 43 are provided between the portions 13' and 13", exact alignment of the various mold cavities and formations and of the wire with one another is insured. Compression springs 34 surrounding the rods 32 urge the mold halves 14' and 14" toward each other.

The positioning or guide arrangement 17 has a base or support 25 rigidly fixed to the extruder 5 adjacent the nozzle 6 and comprises a pair of shoes 22 which engage behind a ridge or rectangular-section projection 21 formed on the mold halves 14' and 14". This ridge 21 is annular and extends around both the top and bottom side of the mold 14, and presents a cylindrical surface that is continuous from one mold pair 14', 14" to another in the region between the axis A and the nozzle 6. Biasing devices 23 are engaged between each of the shoes 22 and the support 25 which itself is mounted via rod 3 on the base 20. These biasing devices can be simple spring arrangements with nuts on rods serving to adjust the spring force, but preferably are constituted as fluid-controlled devices operated from a central controller 2 so as normally to pull the mold 14 and the nozzle 6 toward each other with a predetermined force. The extruder 5 is also mounted via rods 8 slidable on the base 20 radially of the axis A so that the mold assembly 7 remains relatively fixed and the extruder 5 is pulled toward it with a predetermined force.

Similarly further biasing arrangements 24 are connected to the shoes 22 which also ride on the upper and lower surfaces of the mold halves 14' and 14" at the nozzle 6 so as to force the mold halves tightly toward each other during the injecting operation as will be described below. The entire support 25 can be displaced relative to the base 20 of the support by means of a cylinder or further biasing arrangement 26.

Figure 2:
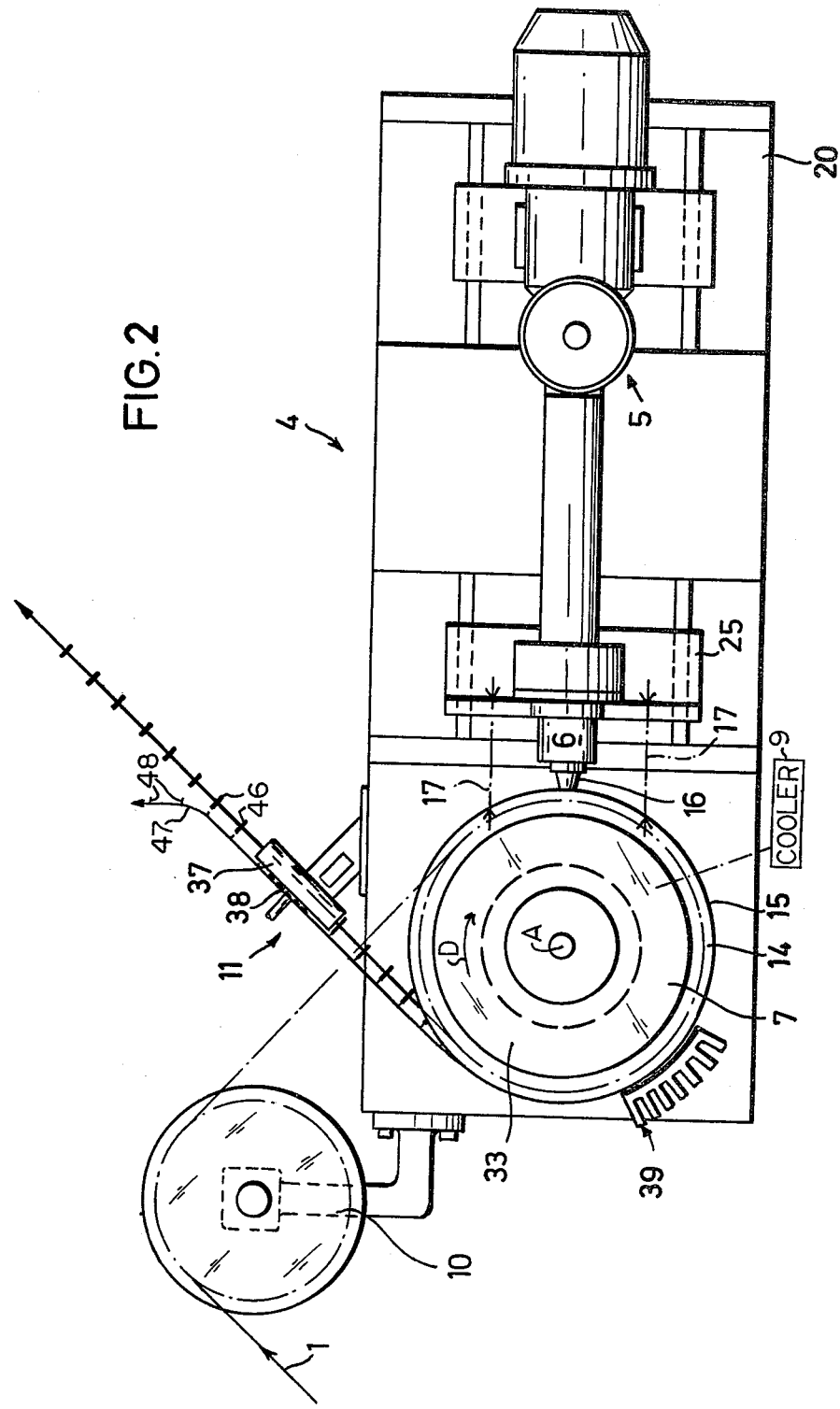
FIG. 2 is a top view of the apparatus of FIG. 1.

The mold halves 14' and 14" are formed with throughgoing coolant passages 40 connected to a cooler 9 shown in FIG. 3 and schematically in FIG. 2. In addition an air-cooled cooling shoe 39 may be arranged riding on the surface 15 downstream of the nozzle 6 relative to the rotation direction D.

The wire to be provided with bodies 46 is fed into the machine over a deflecting roller 10 at a location upstream from the nozzle 6. After formation of the bodies in the manner described in my above-cited copending application the mold halves 14' and 14" are opened by means of the cam 28 and the wire 1, complete with bodies 46 connected to a film 47 by means of sprues 48 issues from the assembly. The thus-formed product is then passed into a stripping arrangement 11 constituted as a slotted tube 37 adjacent to which is rotated at high speed a circular cutting blade 38 that severs the sprues 48 immediately adjacent the bodies 46 and thereby separates the film 47 from the finished product.

During operation of the device the supply 4 extrudes synthetic-resin material against the outer surface 15 with a pressure and at a viscosity such that the nozzle 6 and mold 14 are pressed radially away from each other with a predetermined force. The controller 2 operates the biasing devices 23 at such a pressure that they pull these two elements 6 and 14 toward each other with a force slightly less than this reaction force so that a small amount of material can escape from between the tip 16 and the surface 15 and can therefore form the friction-reducing film 47 in the manner described in detail in my above-referenced application. At the same time the biasers 24 are maintained at a pressure sufficient to hold the portions 13' and 13" tightly enough together that the pressure of the synthetic-resin material in the inlet passages 18 and cavities 19 does not force them apart axially.

Thus with the system according to the present invention it is possible in a very simple manner to mold insulating bodies on a wire. What is more the mold 14 is a relatively simple piece of equipment that can be exchanged in a minimal amount of time so that the apparatus can be used to mold larger or smaller insulating bodies on the wire 1. Centralized operation of the motor 30, extruder 5, and biasers 23, 24 and 26 allows the process to be controlled within very tight limits.

It will be understood that each of the elements described above, or two or more together, may also find a useful application in other types of machines differing from the types described above.

While the invention has been illustrated and described as embodied in a coaxial-cable manufacturing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An apparatus for molding a succession of discrete insulating spacers on an elongated flexible conductor, particularly such which is to be used as an inner conductor of a coaxial cable, comprising a support; a plurality of molds together forming an array which is mounted on said support for displacement in a closed path and has an exposed surface that extends in and along a closed trajectory, each of said molds including a pair of mold members mounted for relative movement toward and away from one another between an open and a closed position and together bounding a cavity in said closed position, and an inlet which extends between said cavity and said exposed surface; means for displacing said array in said path relative to said support so that said exposed surface travels in said trajectory; means for moving said mold members of each respective mold between said positions thereof and for maintaining the same in said open position in a first, and in said closed position in a second, consecutive portion of said path; means for introducing the conductor between said mold members of the respective mold at said first portion of said path for the conductor to extend across the respective cavity in said second portion of said path; means for supplying plastified hardenable material under pressure into said inlet of the respective mold at a predetermined location of said second portion of said path for the material to fill the respective cavity around the conductor, to harden thereabout and thus to form a spacer in said cavity and a sprue in said inlet, in said second portion of said path downstream of said location as considered in the direction of displacement of said array, including a nozzle having an end face which faces said exposed surface of said array at said location and a nozzle end which opens onto said end face; means for withdrawing the conductor together with the spacer from between said mold members at a withdrawing location situated in said first portion of said path; means for reducing wear of said exposed surface of said array and of said end face of said nozzle, including means for mounting at least said nozzle on said support for movement toward and away from said trajectory at said location, means for urging said nozzle toward said trajectory with a variable force, and control means controlling said means for urging so that said force is overcome by a reaction force with which the material emerging from said nozzle end acts on said end face away from said trajectory, forming a gap therebetween containing a film of the material on said exposed surface which film is integral with the sprue, extends at least between said location and said withdrawing location, separates said end face of said nozzle from said exposed surface of said array, and is in a sliding contact with said end face; and means for severing the sprue from the spacer at said withdrawing location to thereby detach the sprue and the film from the spacer.

2. The apparatus defined in claim 1, wherein said array is annular and rotatable about and centered on a mold axis, said pairs being angularly spaced and juxtaposed about said mold axis, said nozzle end being generally angularly fixed relative to said mold axis.

3. The apparatus defined in claim 2; further comprising a positioning plate having an outer periphery serving as a guide for the conductor and lying generally angularly in line with said cavities.

4. The apparatus defined in claim 2; said moving means comprising means on said support for axially pressing together the mold members of that mold directly between said axis and said nozzle.

5. The apparatus defined in claim 4, wherein said means for pressing includes a pair of axially spaced shoes each bearing axially on a respective mold half and biasing means for pressing same axially together with a predetermined axial force.

6. The apparatus defined in claim 2, wherein said reducing means includes means for limitedly radially displacing said nozzle relative to said array.

7. The apparatus defined in claim 6, wherein said supplying means includes an extruder.

8. The apparatus defined in claim 2, wherein said support includes a fixed support shaft centered on said axis and rotationally supporting said moving array, said means including a cam carried on said shaft within said array and axially engageable therewith, said array including a cage rotatable on said shaft and carrying said mold members with freedom of axial movement.

9. The apparatus defined in claim 8, wherein said shaft is tubular and said displacing means includes a drive motor having a drive shaft passing axially through said support shaft and connected to said cage.

10. The apparatus defined in claim 8, wherein said cage includes a pair of axially spaced plates axially flanking said array and a plurality of axially extending rods extending between said plates and passing through said mold members, at least one of said rods passing through each of said molds and each mold being slidable on the respective rod, said means for closing including compression springs braced between said molds and the respective plates.

11. The apparatus defined in claim 2, wherein said mold members of each pair are mirror-symmetrical and formed generally as cylinder segments, said exposed surface being cylindrical and continuous, said inlets opening radially outwardly on said exposed surface.

12. The apparatus defined in claim 2, wherein said mold members are formed with throughgoing cooling passages, said apparatus further comprising means for circulating a coolant therethrough after travel of said molds past said nozzle.

13. The apparatus defined in claim 2; said introducing means including a deflecting element adjacent said array generally axially level with said nozzle end.

14. The apparatus defined in claim 2, wherein said severing means includes a slotted tube on said support adjacent said array through which said conductor with said spacers pass, and a cutting element adjacent said slotted tube operable to cut said sprues and film from said spacers as they pass therethrough.

15. The apparatus defined in claim 2; further comprising means for cooling said mold members of said array downstream of said nozzle end relative to the normal direction of rotation of said array about said axis.

16. The apparatus defined in claim 15, wherein said means for cooling includes a cooled body engaging said mold members downstream of said nozzle end.

17. The apparatus defined in claim 1, wherein said force is slightly smaller than said reaction force.

18. An apparatus for molding a succession of discrete bodies on an elongated flexible element, said apparatus comprising:
   a support;
   a plurality of mold pairs on said support and together forming an annular mold array rotatable about and centered on a mold axis and having an outer surface and each having a mold cavity and an inlet between the respective cavity and said surface, said pairs being angularly spaced and justaposed about said mold axis, each of said mold pairs being formed of a pair of axially engageable mold halves each in turn formed with a respective axially extending ridge;
   a nozzle on said support having a nozzle end spaced from said surface and generally angularly fixed relative to said mold axis;
   drive means on said support for continuously rotating said array past said nozzle end and thereby sequentially aligning said inlets with said nozzle end;
   supply means on said support for continuously feeding plastified and hardenable resin material under pressure to said nozzle end;
   guide means between said array and said nozzle and being engaged between the ridges of those mold halves aligned with said nozzle for spacing said surface from said nozzle end by a predetermined generally constant distance during relative displacement of said nozzle and said mold pairs so that when said nozzle end aligns with a one of said inlets it injects said resin material therethrough into the respective cavity and forms a body therein and a sprue integral therewith in the respective inlet and so that when said nozzle end is not aligned with a one of said inlets said material escapes laterally from between said nozzle end and said surface and forms on said surface a generally continuous film unitary with the previously formed sprues;
   actuator means on said support for sequentially closing said mold pairs on successive spaced-apart portions of said flexible element before injection of said material into the respective cavities and for sequentially opening said mold pairs after hardening of said material in the respective cavities; and
   means on said support for separating said sprues and said film from said bodies after opening of the respective mold pairs.

19. The apparatus defined in claim 18, wherein said guide means includes a pair of axially spaced sliding pull shoes provided between said mold axis and said nozzle and each bearing radially outwardly on the ridge of a respective mold half.

20. The apparatus defined in claim 19, wherein said guide means includes biasing means connected between said shoes and said nozzle and normally urging said parts together with a predetermined force.

* * * * *